United States Patent Office 3,752,660
Patented Aug. 14, 1973

3,752,660
CHLOROPHENOXYACETYLOXAZOLIDONE HERBICIDES AND PREPARATION THEREOF
Edwin D. Little, Convent Station, N.J., assignor to Allied Chemical Corporation, New York, N.Y.
No Drawing. Original application Aug. 27, 1968, Ser. No. 755,743. Divided and this application Mar. 15, 1971, Ser. No. 124,606
Int. Cl. A01n 9/22
U.S. Cl. 71—88                1 Claim

ABSTRACT OF THE DISCLOSURE 3-(chlorophenoxyacetyl)-2-oxazolidones are prepared by reacting a 2-oxazolidone with a chlorinated phenoxyacetyl chloride. When the oxazolidone is unsubstituted in the 5-position, presence of an acid acceptor is helpful to improve yield. The products are useful as herbicides.

This is a division of application Ser. No. 755,743, filed Aug. 27, 1968, now U.S. Pat. No. 3,622,594.

Cross-reference to related application

This application discloses subject matter related to the invention of application of Edwin D. Little entitled "Chlorophenoxyacetamide Herbicides and Preparation Thereof," filed on even date with the instant application.

Background of the invention

This invention relates to novel compounds useful as herbicides; in particular, it relates to chlorophenoxyacetyloxazolidones, their preparation and use as herbicides.

The need to control undesirable plant growth for efficient cultivation of crops has given rise to the development of a great variety of herbicidal agents. However, many of the chemical herbicides available heretofore do not have adequate potency or selectivity to afford optimum results. An effective herbicide must be highly effective against undesirable plants while remaining harmless with respect to the plant being cultivated, such as corn, wheat or cotton.

Summary of the invention

The novel compounds of the instant invention are phenoxyacetyloxazolidones of the formula:

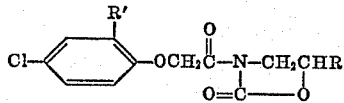

wherein R is selected from the group consisting of hydrogen, alkyl containing up to 6 carbon atoms and alkenyl containing up to 6 carbon atoms; and R' is alkyl containing up to 3 carbon atoms or chlorine. The products are useful herbicides.

The compounds are prepared by reacting a 2-oxazolidone with a chlorinated phenoxyacetyl chloride; when R is hydrogen, the presence of an acid acceptor in the reaction medium is preferred.

Detailed description of the invention

Preparation of the instant compounds is unexpectedly accomplished by reacting a 2-oxazolidone with a phenoxyacetyl chloride, according to the following sequence:

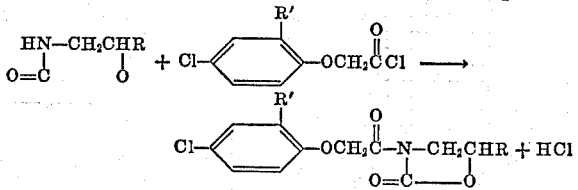

wherein R and R' are as aforesaid. Surprisingly, when R is hydrogen, it is preferred that an acid acceptor be present to obtain the desired product; when R is other than hydrogen, the reaction can be conducted satisfactorily without the presence of an acid acceptor.

Approximately equimolar amounts of the two substrates are used, although an excess of either might be used to achieve a higher yield with respect to the other.

The amount of acid acceptor which is preferably used when R is hydrogen is sufficient to neutralize the full amount of hydrogen chloride which is co-produced, i.e., an amount equivalent to the theoretical amount of hydrogen chloride to be formed. Most preferably, the reaction will be conducted at a pH greater than about 7.0 when R is hydrogen.

Acid acceptors which are suitable for the instant reaction include amines such as pyridine, triethylamine and tributylamine. Also, inorganic bases such as sodium hydroxide might be used. Triethylamine is the preferred base.

The reaction may be conducted in an inert solvent although it is more convenient not to use solvent. For this purpose, the reaction is conducted above the melting point of the oxazolidone, e.g. above about 89° C. for 2-oxazolidone itself. Generally, the temperature will be between the melting point of the oxazolidone and 150° C. Reaction times as short as about one hour or less have been found to be adequate, although longer reaction times may be used if desired.

Atmospheric pressure is normally used for the reaction, although subatmospheric conditions may be used if desired.

The reaction might be conducted in an inert solvent, if desired, such as chloroform or carbontetrachloride or in a solvent amount of liquid base, such as triethylamine or tributylamine. Conditions regarding reaction temperature, time and pressure specified hereinbefore are appropriate for this purpose, although somewhat lower temperatures might be used if desired.

Substrate materials are readily available by procedures taught in the prior art. For example, 2-oxazolidones might be prepared by heating tris(2-hydroxyalkyl)isocyanurates or tris(2-hydroxyalkenyl)isocyanurates to 150–250° C. in the manner taught by U.S. Pat. 3,108,115, and the various phenoxyacetyl chlorides are available by treating the corresponding phenoxyacetic acid with thionyl chloride, which acid is in turn prepared by reacting the corresponding phenol with monochloroacetic acid.

The instant compounds have been found to be unexpectedly effective herbicides in that they are very harmful to plants normally considered undesirable, such as rape and broadleafed weeds, while being harmless toward such plants as soybeans, corn, wheat, and cotton. Preferred compounds are 3-(2,4-dichlorophenoxyacetyl)-5-methyloxazolidone-2 (R' is chlorine, R is methyl); 3-(4-chloro-2-methylphenoxyacetyl) - 5 - methyloxazolidone-2 (R' and R are methyl); 3-(2,4-dichlorophenoxyacetyl) oxazolidone-2 (R' is chlorine, R is hydrogen); and 3-(4-chloro-2-methylphenoxyacetyl)-5-vinyloxazolidone-2 (R' is methyl, R is vinyl).

Normally the instant compounds will be used as the active ingredient in an herbicidal composition, although they might also be used without a carrier. Various diluents and carriers may be employed and the percent of active ingredient may be varied. Although compositions with less than about 0.5% by weight of active ingredient may be used, it is preferable to use compositions containing at least about 1.0% of active ingredient because otherwise the amount of carrier becomes excessively large. Activity increases with the concentration of active ingredient, which may be 10, 50, 95% or even higher.

The amount of composition which is applied for effective herbicidal action is dependent upon considerations such as the type of undesirable plant to be killed, the density of undesirable plants, and soil and climatic conditions. Usually, sufficient composition will be applied to provide about 2-16 pounds of active ingredient per acre.

The instant insecticidal compositions may be in the form of a solution, with the solvent being selected from acetone, benzene, petroleum fractions and the like. These solutions can be applied to the plants in a direct manner such as by spraying, sprinkling, drenching, etc. Water suspensions can also be applied in this manner, with dispersing and emulsifying agents such as sodium alkyl sulfates and sulfonates and the like.

Application can also be achieved by dusting a powder in which the active ingredient is dispersed. Suitable carriers include finely powdered material such as clay, fuller's earth, talc., etc.

The instant compounds may constitute the sole active ingredient in the herbicidal compositions, but they might be effectively used in combination with other active ingredients, such as other herbicides, insecticides and other plant treating agents.

The following examples are provided to more fully illustrative the instant invention. They are provided for illustrative purposes only and are not to be construed as limiting the scope of the instant invention, which is defined by the appended claim.

EXAMPLE I 3-(4-chloro-2-methylphenoxyacetyl)-5-methyloxazolidone-2

5-methyloxazolidone-2 (10 g., 0.1 mole) was heated to about 100° C. over a steam bath and (4-chloro-2-methylphenoxy)-acetyl chloride (22 g., 0.1 mole) was added thereto. Heating was continued for an additional 30 minutes, after which time the reaction mixture was poured onto ice water. The precipitated solid was collected by filtration, washed twice with water, and then recrystallized from hot acetone. The resulting material, 14.5 g. (51%), M.P. 117-122° C., was recrystallized from absolute alcohol to afford the desired product, 13 g. (46%), M.P. 125° C.

*Analysis.*—Calcd for $C_{13}H_{14}ClNO_4$ (percent): C, 55.0; H, 4.94; N, 4.94. Found (percent): C, 54.80; H, 5.02; N, 5.18.

EXAMPLE II

The procedure of Example I was repeated using appropriately substituted oxazolidones and phenoxyacetyl chlorides to afford the following compounds:

3-(2,4-dichlorophenoxyacetyl)-5-methyloxazolidone-2
3-(2,4-dichlorophenoxyacetyl)-5-vinyloxazolidone-2
3-(4-chloro-2-methylphenoxyacetyl)-5-vinyloxazolidone-2

EXAMPLE III

The procedure of Example I is repeated using appropriately substituted oxazolidones and phenoxyacetyl chlorides to afford the following compounds:

3-(2,4-dichlorophenoxyacetyl)-5-isopropyloxazolidone-2
3-(2,4-dichlorophenoxyacetyl)-5-n-hexyloxazolidone-2
3-(2,4-dichlorophenoxyacetyl)-5-allyloxazolidone-2

EXAMPLE IV 3-(2,4-dichlorophenoxyacetyl)oxazolidone-2

2-oxazolidone (8.5 g., 0.097 mole) was melted over a steam bath, and to the fused material was added 2,4-dichlorophenoxyacetyl chloride (24 g., 0.1 mole). The mixture was heated over the steam bath for an additional 30 minutes, after which time it was mixed with ice water. The resulting precipitate was separated by filtration, washed with two portions of water and then thoroughly mixed with water in a blender and separated again by filtration. The solids were placed in hot alcohol and the insoluble material was separated by filtering the hot mixture. The separated solids were dried to afford the desired product, 5.0 g. (17.7%), M.P. 170-171° C.

EXAMPLE V

The procedure of Example IV was repeated wherein triethylamine (10.1 g., 0.1 mole) was added to the initial melt of 2-oxazolidone, resulting in the formation of 3-(2,4-dichlorophenoxyacetyl)oxazolidone-2 product in improved yield.

EXAMPLE IV

Herbicidal activity

The following crop species and weed species were planted in metal flats (12 x 8.5 x 4 inches) in greenhouse potting soil containing one-third mixed clay and sand, one-third mushroom soil, and one-third peat moss. The pH of the soil was 6.8-7.2.

Crop species:
   Corn, *Zea mays,* Hybrid U.S. 13
   Wheat, *Triticum vulgare,* variety Thorne
   Cotton, *Gossypium hirsutum,* variety Delta Pine Lane Fox No. 20
   Soybean, *Soja wax,* variety Wilson
Weed species:
   Annual ryegrass, *Lolium multiflorum*
   Rape, *Brassica napus*
   Crabgrass, *Digitaria sanguinalis*

Each flat received a volume of spray equal to 80 gallons per acre of an acetone solution of the herbicide. The concentration of the solution was adjusted to provide application of 2, 4 and 16 pounds of active ingredient per acre. Immediately after spraying, the test flats were placed in aluminum trays and were irrigated until the surface of the soil in the flat was uniformly moist (at field capacity). Additional subirrigation was provided as needed to maintain moisture. No surface irrigation was applied.

The flats were sprayed within one day after seeding in preemergence tests, and 8-10 days after seeding in the post-emergence tests. Results were observed 14 days after spraying.

The effect of the herbicide was evaluated in terms of the injury rating index scale, ranging from 0 to 10 as follows:

0—No apparent injury
1, 2, 3—Slight injury
4, 5, 6—Moderate injury
7, 8, 9—Severe injury (plants will die)
10—Plants were dead An injury rating of 3 is the maximum tolerated for crops and a rating of 7 is the minimum acceptable on weed plants.

3-(2,4-dichlorophenoxyacetyl)-5-methyloxazolidone-2

| | Injury rating | | | | | |
|---|---|---|---|---|---|---|
| | Preemergence | | | Postemergence | | |
| Plant | (1) | (2) | (3) | (1) | (2) | (3) |
| Corn | 1 | 0 | 0 | 2 | 2 | 0 |
| Wheat | 4 | 0 | 0 | 0 | 0 | 0 |
| Cotton | 4 | 2 | 0 | 10 | 10 | 10 |
| Soybeans | 4 | 2 | 4 | 10 | 10 | 10 |
| Ryegrass | 0 | 0 | 0 | 0 | 0 | 0 |
| Rape | 9 | 6 | 5 | 10 | 10 | 10 |
| Crabgrass | 9.5 | 7 | 5 | Not tested | | |

[1] 16 pounds of active ingredient per acre.
[2] 4 pounds of active ingredient per acre.
[3] 2 pounds of active ingredient per acre.

3-(4-chloro-2-methylphenoxyacetyl)-5-methyloxazolidone-2

| Plant | Injury rating | | | | | |
|---|---|---|---|---|---|---|
| | Preemergence | | | Postemergence | | |
| | (1) | (2) | (3) | (1) | (2) | (3) |
| Corn | 1 | 0 | 0 | 2 | 2 | 0 |
| Wheat | 1 | 0 | 0 | 0 | 0 | 0 |
| Cotton | 0 | 0 | 0 | 10 | 10 | 10 |
| Soybeans | 3 | 0 | 0 | 10 | 10 | 10 |
| Ryegrass | 0 | 0 | 0 | 0 | 0 | 0 |
| Rape | 9 | 7 | 5 | 10 | 10 | 10 |
| Crabgrass | 9 | 7 | 5 | Not tested | | |

[1] 16 pounds of active ingredient per acre.
[2] 4 pounds of active ingredient per acre.
[3] 2 pounds of active ingredient per acre.

3-(2,4-dichlorophenoxyacetyl)oxazolidone-2

| Plant | Injury rating | | | | | |
|---|---|---|---|---|---|---|
| | Preemergence | | | Postemergence | | |
| | (1) | (2) | (3) | (1) | (2) | (3) |
| Corn | | 2 | 0 | 0 | 2 | 0 |
| Wheat | | 0 | 0 | 0 | 0 | 0 |
| Cotton | | 3 | 0 | 10 | 9 | 9.5 |
| Soybeans | | 0 | 0 | 10 | 9 | 7 |
| Ryegrass | | 0 | 0 | 0 | 0 | 0 |
| Rape | | 9 | 9 | 10 | 9 | 9.5 |
| Crabgrass | 7 | | | Not tested | | |

[1] 16 pounds of active ingredient per acre.
[2] 4 pounds of active ingredient per acre.
[3] 2 pounds of active ingredient per acre.

3-(4-chloro-2-methylphenoxyacetyl)-5-vinyloxazolidone-2

| Plant | Injury rating | | | | | |
|---|---|---|---|---|---|---|
| | Preemergence | | | Postemergence | | |
| | (1) | (2) | (3) | (1) | (2) | (3) |
| Corn | 4 | 2 | 1 | 0 | 0 | 0 |
| Wheat | | 0 | 0 | 0 | 3 | 3 |
| Cotton | 2 | 0 | 3 | 10 | 10 | 10 |
| Soybeans | 2 | 0 | 0 | 10 | 9 | 9 |
| Ryegrass | 5 | 2 | 2 | 0 | 0 | 0 |
| Rape | 9 | 9 | 9 | 10 | 10 | 10 |
| Crabgrass | | 9 | 5 | Not tested | | |

[1] 16 pounds of active ingredient per acre.
[2] 4 pounds of active ingredient per acre.
[3] 2 pounds of active ingredient per acre.

What is claimed is:
1. A herbicidal composition comprising a herbicidally effective amount of 3-(4-chloro-2-methylphenoxyacetyl)-5-vinyloxazolidone-2 and a carrier.

References Cited
UNITED STATES PATENTS
3,221,021   11/1965   Hickner _____ 260—307

LEWIS GOTTS, Primary Examiner
C. L. MILLS, Assistant Examiner

UNITED STATES PATENT OFFICE
CERTIFICATE OF CORRECTION

PO-1050
(5/69)

Patent No. 3,752,660           Dated    August 14, 1973

Inventor(s)     Edwin D. Little

It is certified that error appears in the above-identified patent and that said Letters Patent are hereby corrected as shown below:

Column 1, under "Detailed Description of the Invention", line 66, in formula:

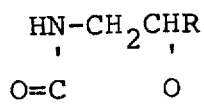

should read:

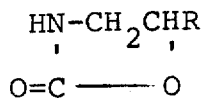

Signed and sealed this 25th day of December 1973.

(SEAL)
Attest:

EDWARD M. FLETCHER, JR.        RENE D. TEGTMEYER
Attesting Officer               Acting Commissioner of Patents